(12) United States Patent
Le Chevalier et al.

(10) Patent No.: US 9,542,392 B2
(45) Date of Patent: Jan. 10, 2017

(54) MAPPING PUBLISHED RELATED CONTENT LAYERS INTO CORRELATED RECONSTRUCTED DOCUMENTS

(71) Applicant: Chegg, Inc., Santa Clara, CA (US)

(72) Inventors: Vincent Le Chevalier, San Jose, CA (US); Pierce Trowbridge Wetter, III, Santa Clara, CA (US); Joshua Richardson, Cupertino, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 133 days.

(21) Appl. No.: 14/170,289

(22) Filed: Jan. 31, 2014

(65) Prior Publication Data

US 2015/0220518 A1    Aug. 6, 2015

(51) Int. Cl.
*G06F 17/30* (2006.01)

(52) U.S. Cl.
CPC ... *G06F 17/30011* (2013.01); *G06F 17/30312* (2013.01); *G06F 17/30613* (2013.01); *G06F 17/30321* (2013.01); *G06F 17/30864* (2013.01)

(58) Field of Classification Search
None
See application file for complete search history.

(56) References Cited

U.S. PATENT DOCUMENTS

| 2008/0195925 A1* | 8/2008 | Auguste | G11B 27/11 715/201 |
| 2010/0169460 A1* | 7/2010 | Angell | G06F 17/30861 709/219 |
| 2011/0035662 A1* | 2/2011 | King | G06F 17/211 715/273 |

* cited by examiner

*Primary Examiner* — Rehana Perveen
*Assistant Examiner* — Raheem Hoffler
(74) *Attorney, Agent, or Firm* — Fenwick & West LLP

(57) ABSTRACT

An electronic publishing platform maps supplemental content layers associated with one or more paired target documents, such as user-generated content layers associated with the paired target documents, into a source document. The publishing platform correlates content items in the source document to content items in the paired target documents. Based on the correlation, the publishing platform generates indexes mapping the source document content items to the paired target document content items. The publishing platform uses the indexes to map supplemental content layers associated with the paired target document to the source document.

19 Claims, 7 Drawing Sheets

MAPPING PUBLISHED RELATED CONTENT LAYERS INTO CORRELATED RECONSTRUCTED DOCUMENTS

BACKGROUND

Field of the Invention

This disclosure relates to correlating documents and mapping supplemental content layers into correlated documents in an online education platform.

Description of the Related Art

The rapid shift to mobile Internet services is bringing content offerings to an increasingly larger number of connected devices. Experiences previously limited to a single device are now accessible across multiple devices as high volume consumer electronic platforms such as smartphones, tablets, eReaders, game systems, Internet TVs, and wearable devices have become new channels to receive digital documents and services. As digital documents are shifting from a static model to a connected one where related, personalized, and other social content are being aggregated dynamically within the original assets, the definition of a document needs to be adjusted to this model and its content properties revisited accordingly.

Textbook publishers regularly publish new editions of textbooks, often every two or three years. The content of these new editions often overlaps with content from the previous editions. However, when a new edition of a textbook is published, the dynamically aggregated content associated with the previous edition is lost. Thus, initial readers of the new edition do not have the benefit of the dynamically aggregated content associated with the previous edition.

SUMMARY

An electronic publishing platform maps related content layers associated with one or more paired target documents into a source document. The publishing platform correlates content items in the source document to content items in the paired target documents. Based on the correlation, the publishing platform generates indexes mapping the source document content items to the paired target document content items.

In one embodiment, the paired target document has one or more supplemental content layers associated with content items in the target document. Some of these supplemental content layers are dynamically generated as users read and interact with a document. Using the indexes mapping the source document content items to the target document content items, the publishing platform maps the related content layers to the source document. In one example, the source document is a new edition of the target document recently added to a content catalog of the publishing platform. The publishing platform maps the supplemental content layers to the source document to supplement the source document. Thus, initial readers of the source document gain the benefit of the dynamically-generated supplemental content layers.

In another embodiment, the publishing platform uses the indexes mapping the source document content items to the target document content items to classify the subject matter. The publishing platform determines differences between the source document and the paired target document. Based on the differences between the documents, the publishing platform classifies the source and paired target document.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Online Education Platform

Figure 1:
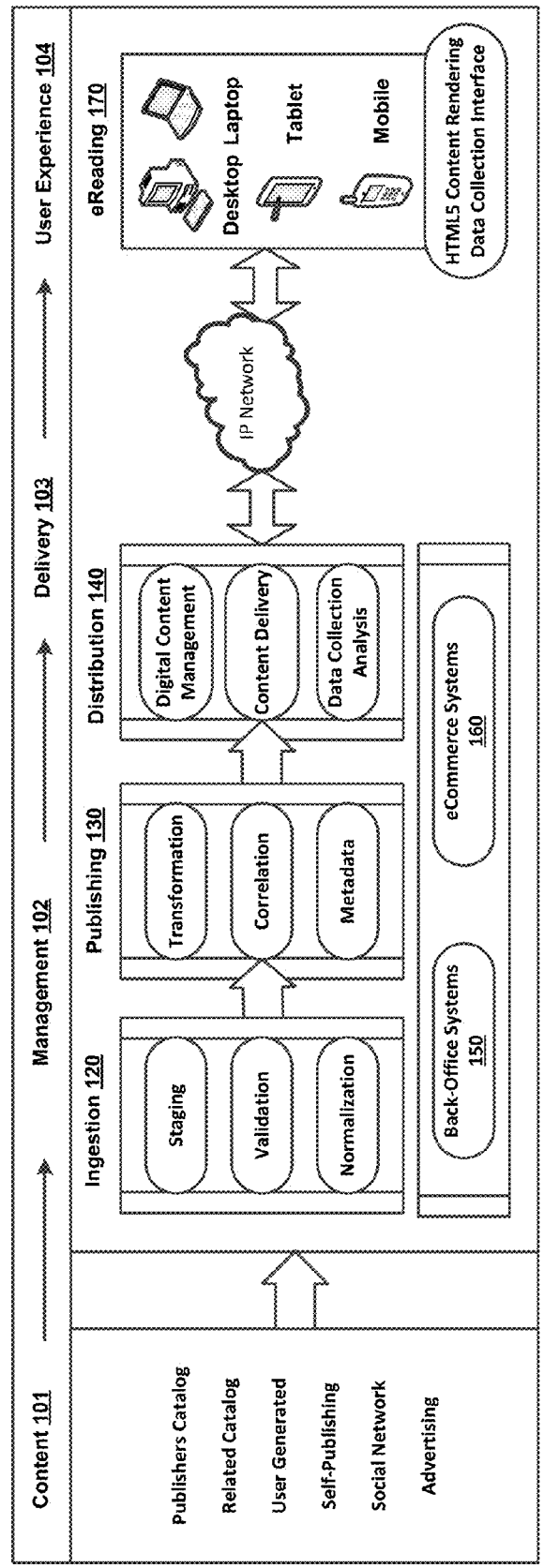
FIG. 1 illustrates an example publishing platform, according to one embodiment.

FIG. 1 is a high-level block diagram illustrating the education platform environment 100. The education platform environment 100 is organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 3.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate supplemental content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In some cases, the social content and user-generated content layers associated with a document are specific to a user. For example, registered users may each have a personal electronic notepad associated with a foundation document. In other cases, these content layers may be self-published by a user and made available to other users as a related content layer associated with a document or as a standalone document. In still further cases, the publishing system 130 aggregates the content generated by user interactions with a document and associates the aggregated content with the document as a related content layer. As used herein, a "layer" refers to a set of content items having a similar content type, created by the same user, generated within the same period of time, or having other similarities. Thus, a user-generated content layer refers to a set of content items generated by the same user or to a set of similar content items (e.g., a set of notes), a testing content layer refers to a set of testing content items generated by the same instructor or generated for the same set of students, and so forth.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document. In some cases, the foundation document is referred to a foundation layer of a multilayered document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading and other educational activities to be recorded by the platform, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Platform Content Processing and Distribution

Figure 2:
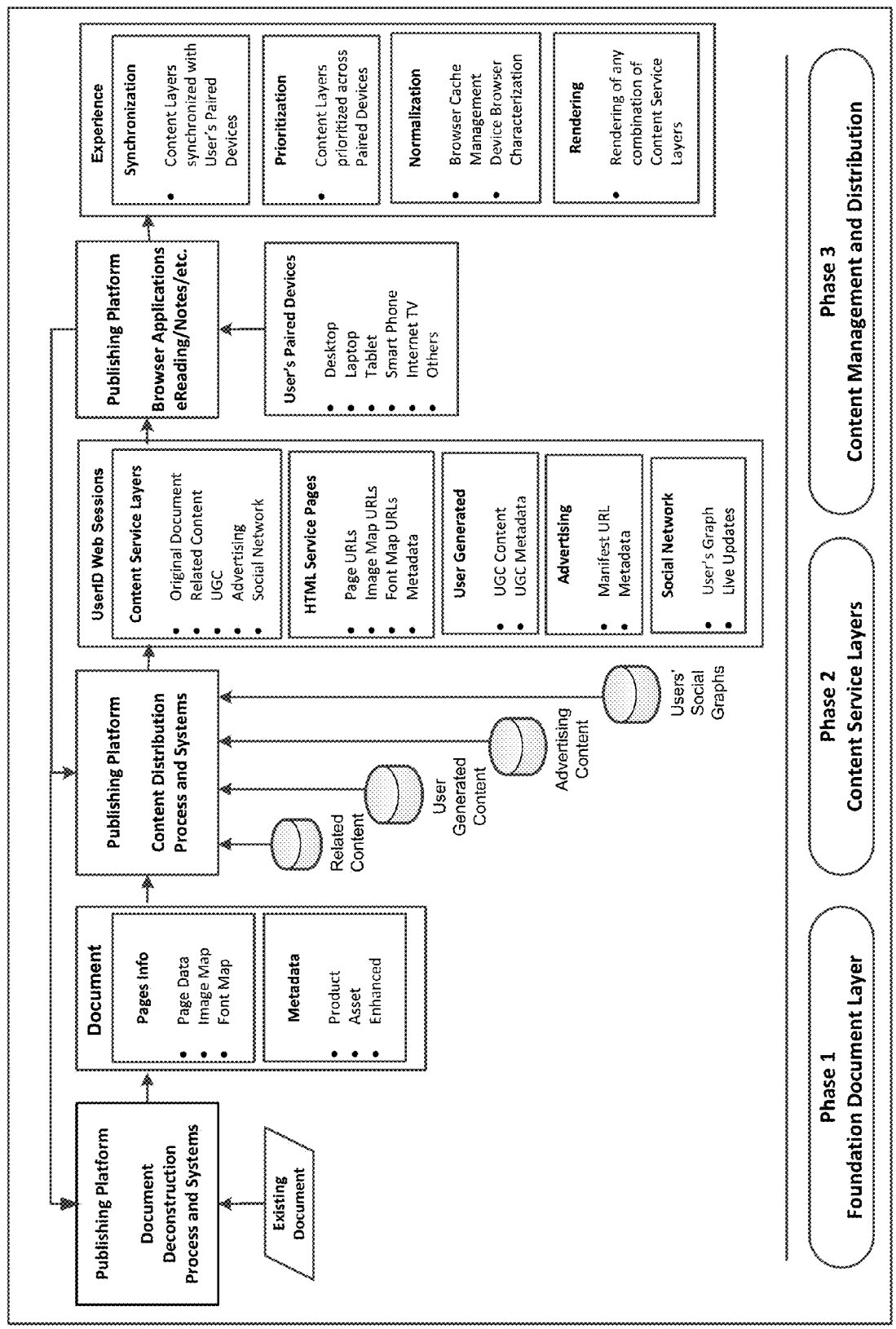
FIG. 2 is a block diagram illustrating interactions with a publishing platform, according to one embodiment.

The platform content catalog is a mosaic of multiple content sources which are collectively processed and assembled into the overall content service offering. The content catalog is based upon multilayered publications that are created from reconstructed foundation documents augmented by supplemental content material resulting from users' activities and platform back-end processes. FIG. 2 illustrates an example of a publishing platform where multilayered content document services are assembled and distributed to desktop, mobile, tablet, and other connected devices. As illustrated in FIG. 2, the process is typically segmented into three phases: Phase 1: creation of the foundation document layer; Phase 2: association of the content service layers to the foundation document layer; and Phase 3: management and distribution of the content.

During Phase 1, the licensed document is ingested into the publishing platform and automatically reconstructed into a series of basic elements, while maintaining page fidelity to the original document structure. Document reconstruction will be described in more detail below with reference to FIG. 3.

During Phase 2, once a foundation document has been reconstructed and its various elements extracted, the publishing platform runs several processes to enhance the reconstructed document and transform it into a personalized multilayered content experience. For instance, several distinct processes are run to identify the related content to the reconstructed document, user generated content created by registered users accessing the reconstructed document, advertising or merchandising material that can be identified by the platform and indexed within the foundation document and its layers, and social network content resulting from registered users' activities. By having each of these processes focusing on specific classes of content and databases, the elements referenced within each classes become identified by their respective content layer. Specifically, all the related content page-based elements that are matched with a particular reconstructed document are classified as part of the related content layer. Similarly, all other document enhancement processes, including user generated, advertising and social among others, are classified by their specific content layer. The outcome of Phase 2 is a series of static and dynamic page-based content layers that are logically stacked on top of each other and which collectively enhance the reconstructed foundation document.

During Phase 3, once the various content layers have been identified and processed, the resulting multilayered content are then published to the platform content catalog and pushed to the content servers and distribution network for distribution. By having multilayered content services served dynamically and on-demand through secured authenticated web sessions, the content distribution systems are effectively authorizing and directing the real-time download of page-based layered content services to a user's paired devices. These devices access the services through time sensitive dedicated URLs which, in one embodiment, only stay valid for a few minutes, all under control of the platform service provider. The browser-based applications are embedded, for example, into HTML5 compliant web browsers which control the fetching, requesting, synchronization, prioritization, normalization and rendering of all available content services.

Document Reconstruction

The publishing system 130 receives original documents for reconstruction from the ingestion system 120 illustrated in FIG. 1. These original documents may include course-related materials such as textbooks, study guides, and assignments; job-related materials such as job listings and job recall materials; or other types of document. In one embodiment, a series of modules of the publishing system 130 are configured to perform the document reconstruction process.

Figure 3:
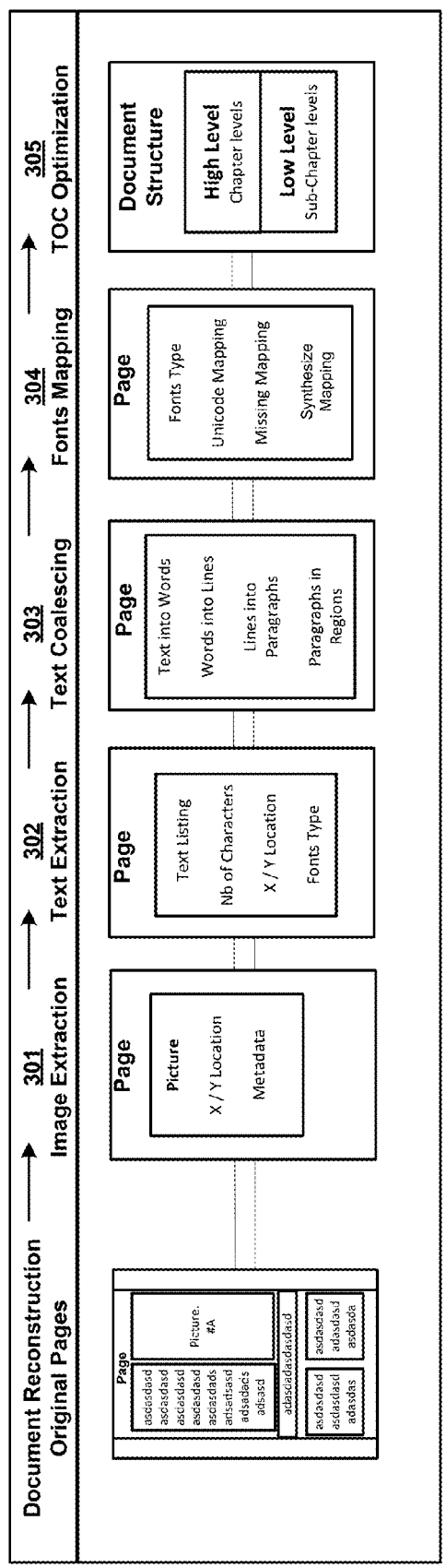
FIG. 3 illustrates a document reconstruction process, according to one embodiment.

FIG. 3 illustrates a process within the publishing system 130 for reconstructing a document. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

During image extraction 301, graphical objects within a page are identified and their respective regions and bounding boxes are determined. For example, a path object in a PDF page may include multiple path construction operators that describe vector graphics made up of lines, rectangles, and curves. Metadata associated with each of the images in the document page is extracted, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The position information of each image may also be determined. The position information of the images can be used to provide page fidelity when rendering the document pages in eReading browser applications, especially for complex documents containing multiple images per page. A caption associated with each image that defines the content of the image may also be extracted by searching for key words, such as "Picture", "Image", and "Tables", from text around the image in the original page. The extracted image metadata for the page may be stored to the overall document metadata and indexed by the page number.

Image extraction 301 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

During text extraction 302, text and embedded fonts are extracted from the original document and the locations of the text elements on each page are identified.

Text is extracted from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. Embedded fonts may also be extracted from the original document, which are stored and referenced by client devices for rendering the text content.

The output of text extraction 302, therefore, a dataset referenced by the page number, comprising the characters and glyphs in a Unicode character mapping with associated location information and embedded fonts used in the original document.

Text coalescing 303 coalesces the text characters previously extracted. In one embodiment, the extracted text characters are coalesced into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, text coalescence into words is performed based on spacing. The spacing between adjacent characters is analyzed and compared to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

Additionally or alternatively, extracted text characters may be assembled into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the same text is analyzed by both spacing and semantics, so that word grouping results may be verified and enhanced.

Words may be assembled into lines by determining an end point of each line of text. Based on the text direction, the horizontal spacing between words may be computed and averaged. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, lines may be assembled into paragraphs. Based on the text direction, the average vertical spacing between consecutive lines can be computed. The end of the paragraph may have a vertical spacing that is larger than the average. Additionally or alternatively, semantic analysis may be applied to relate syntactic structures of phrases and sentences, so that meaningful paragraphs can be formed.

The identified paragraphs may be assembled into bounding boxes or regions. In one embodiment, the paragraphs may be analyzed based on lexical rules associated with the corresponding language of the text. A semantic analyzer may be executed to identify punctuation at the beginning or end of a paragraph. For example, a paragraph may be expected to end with a period. If the end of a paragraph does not have a period, the paragraph may continue either on a next column or a next page. The syntactic structures of the paragraphs may be analyzed to determine the text flow from one paragraph to the next, and may combine two or more paragraphs based on the syntactic structure. If multiple combinations of the paragraphs are possible, reference may be made to an external lexical database, such as WORDNET®, to determine which paragraphs are semantically similar.

In fonts mapping 304, in one embodiment, a Unicode character mapping for each glyph in a document to be reconstructed is determined. The mapping ensures that no two glyphs are mapped to a same Unicode character. To achieve this goal, a set of rules is defined and followed, including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, pattern recognition techniques may be applied on the rendered font to identify Unicode characters. If pattern recognition is still unsuccessful, the unrecognized characters may be mapped into the private use area (PUA) of Unicode. In this case, the semantics of the characters are not identified, but the encoding uniqueness is guaranteed. As such, rendering ensures fidelity to the original document.

In table of contents optimization 305, content of the reconstructed document is indexed. In one embodiment, the indexed content is aggregated into a document-specific table of contents that describes the structure of the document at the page level. For example, when converting printed publications into electronic documents with preservation of page fidelity, it may be desirable to keep the digital page numbering consistent with the numbering of the original document pages.

The table of contents may be optimized at different levels of the table. At the primary level, the chapter headings within the original document, such as headings for a preface, chapter numbers, chapter titles, an appendix, and a glossary may be indexed. A chapter heading may be found based on the spacing between chapters. Alternatively, a chapter heading may be found based on the font face, including font type, style, weight, or size. For example, the headings may have a font face that is different from the font face used throughout the rest of the document. After identifying the headings, the number of the page on which each heading is located is retrieved.

At a secondary level, sub-chapter headings within the original document may be identified, such as dedications and acknowledgments, section titles, image captions, and table titles. Vertical spacing between sections, text, and/or font face may be used to segment each chapter. For example, each chapter may be parsed to identify all occurrences of the sub-chapter heading font face, and determine the page number associated with each identified sub-chapter heading.

The result of the document reconstruction process illustrated in FIG. 3 is a set of document structure metadata specifying information required to display the foundation document with page fidelity to the original document, including locations of content items in the foundation document, fonts, styles, and so forth. Each content item in the foundation document, including portions of text (e.g., lines, paragraphs, or sections), graphics, images, and tables, is indexed by a document part ID specifying the location of the content item in the foundation document.

Document Correlation System

Figure 4:
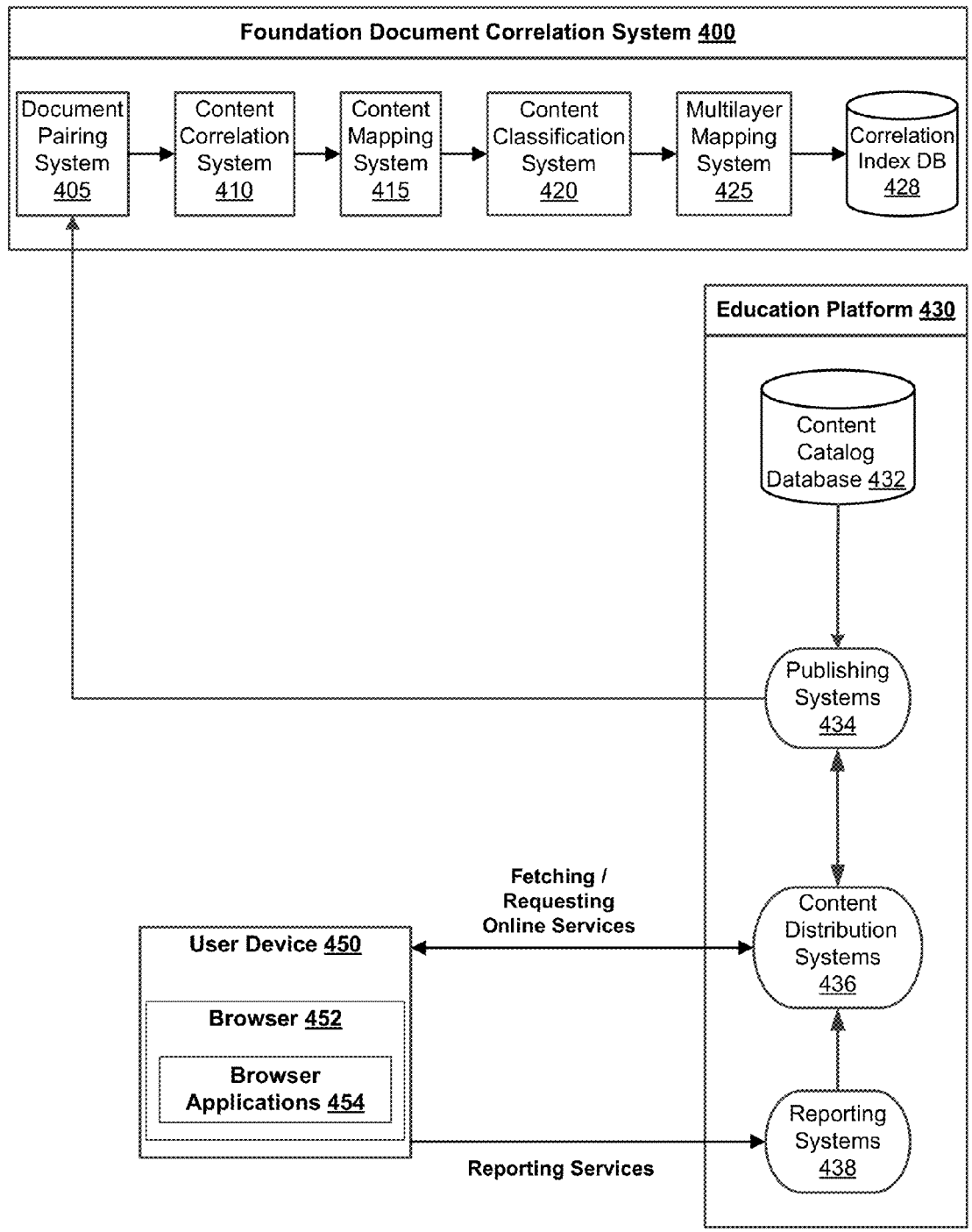
FIG. 4 illustrates a foundation document correlation system, according to one embodiment.

FIG. 4 illustrates an overview of a foundation document correlation system 400, according to one embodiment. FIG. 4 demonstrates interactions between the foundation document correlation system 400, an education platform 430, and a user device 450. The user device 450 executes one or more browser applications 454 within an HTML5 browser environment 452. In some embodiments, the foundation document correlation systems 400 may be integrated as part of the education platform 430 and/or the platform environment 100 illustrated in FIG. 1, and in other embodiments they may be separate systems. Likewise, the browser application 454 may be the same as the eReading application 170 of the experience block 104 of the platform environment 100, or the functionality may be implemented in different systems or modules.

The education platform 430 serves education services to the browser application 454 based on a process of requesting and fetching on-line services in the context of authenticated on-line sessions. In the example illustrated in FIG. 4, the education platform 430 includes a content catalog 432, publishing systems 434, content distribution systems 436, and reporting systems 438. The content catalog 432 contains the collection of content available via the education platform 430. The content catalog 432 feeds the content to the publishing systems 434. The publishing systems 434 serve the content to the browser applications 454 via the content distribution system 436. Reporting systems 438 receive reports of user experience and user activities from the user devices 450 operated by registered users. This feedback is used by content distribution system 436 for managing the distribution of the content and for capturing user-generated content and other forms of user activities to add to the content catalog 432.

In particular, the education platform 430 uses the user activity reports to generate supplemental content layers associated with foundation documents. These supplemental content layers may include related content layers, such as terms listings, as well as user-generated content, such as notes and highlights. Based on the reports received from the browser application 454, the education platform 430 integrates user-generated content into end-user accounts. For example, as a registered user takes electronic notes associated with a foundation document, the education platform 430 adds the notes to a notepad associated with the foundation document. In one embodiment, the education platform 430 links each note to a location in the foundation document. As another example, a registered user highlights passages of a foundation document. The education platform 430 stores an identifier of each highlighted passage, and makes the highlights available on all devices of the user.

The education platform 430 may also use the reports to generate supplemental content layers for distribution to other registered users. For example, an educational instructor self-publishes a document, such as course notes or testing materials, associated with the textbook used in the instructor's course. As another example, the education platform 430 generates a dynamic terms listing for a foundation based on users' searches. When a user searches for a term in the foundation document, the browser application 454 transmits the user's search to the education platform 430. The platform 430 compiles a list of the terms for which users search, retrieves definitions associated with the terms, and stores the list of terms and their associated definitions in the content catalog 432 as a related content layer associated with the foundation document. As yet another example, the education platform 430 identifies commonly-highlighted passages of a foundation document based on reports of users' highlighting activities. The education platform 430 stores the most common highlights in the content catalog 432 as a crowd-sourced highlight layer associated with the foundation document. Some of these content layers are dynamically generated and updated as users interact with the foundation documents. Thus, these content layers acquire more information and become more useful to users as more users read and interact with a foundation document.

The foundation document correlation system 400 maps content items in foundation documents of the education platform 430 to similar content items in another foundation document. In one embodiment, the foundation document correlation system 400 uses the mappings between content items in foundation documents to map additional content layers into a foundation document. For example, the foundation document correlation system 400 maps user-generated and related content layers of a textbook to a new edition of the textbook. Alternatively, the foundation document correlation system 400 may use the mappings to identify differences between foundation documents. Based on the identified differences, the foundation document correlation system 400 classifies the subject matter of the foundation documents. In one embodiment, the foundation document correlation system 400 comprises a document pairing system 405, a content correlation system 410, a content mapping system 415, a content classification system 420, a multilayer mapping system 425, and a correlation index database 428.

The document pairing system 405 pairs a source foundation document to one or more target foundation documents. To pair the source foundation document to a target document, the document pairing system 405 identifies a foundation document in the content catalog 432 having similar content to the source document. The document pairing system 405 identifies content similarities based on product attributes of the source document and the documents in the content catalog 432, such as titles, subjects, authors, publishers, edition numbers, publication dates, keywords, or other product attributes. In one embodiment, if a source foundation document has an edition number, the document pairing system 405 pairs the source foundation document to target documents in the content catalog 432 having the same title as the source document but a different edition number. For example, if the source document is the third edition of "Biology 101," the document pairing system 405 pairs the source document to the first and second editions, or just the second edition, of "Biology 101." The document pairing system 405 may identify target documents using multiple product attributes. For example, the document pairing system 405 may use both title and publisher of a source document to identify target documents and pair them to a source document. A process for pairing source and target documents is described further with respect to FIG. 5.

In some cases, the document pairing system 405 selects a subset of target documents with product attributes matching the product attributes of the source document for pairing to the source document. For example, if the source document is a new version of a textbook for which multiple editions are available in the content catalog 432, the document pairing system 405 may select a subset of the available editions for pairing to the source document. In one embodiment, the document pairing system 405 selects the subset based on age of the target documents. In this case, the document pairing system 405 may pair the source document to target documents published within a threshold number of years, but excludes target documents that are older than the threshold. The threshold may be based on the subject matter of the source document. For example, the threshold for science textbooks may be smaller than the threshold for history textbooks, such that a history source document is potentially paired to older target documents than a science source document. In another embodiment, the document pairing system 405 selects a fixed number of target documents for pairing to a source document. For example, the document pairing system 405 may select only the most recent edition of a textbook for pairing to a new edition of the textbook, regardless of the number of preceding editions.

In one embodiment, the document pairing system 405 filters the foundation documents in the content catalog 432 based on domain or subject of the source document prior to pairing the source document to target documents. For example, the textbook "Biology 101" is associated with the domain "science" and the subject "biology." The document pairing system 405 filters the content catalog 432 to identify a set of foundation documents associated with the "science" domain or "biology" subject. The document pairing system 405 then identifies target documents from the identified set for pairing to the source document.

The content correlation system 410 correlates content items of the source foundation document to content items of target foundation documents. In one embodiment, the content correlation system 410 performs the correlation for content items of the target foundation documents paired to the source document by the document pairing system 405. However, in other embodiments, the content correlation system 410 correlates source content items to content items of a target document not paired to the source document. For example, the content correlation system 410 may identify target content items having similar keywords to the source content items, and correlate the source content items to the identified target content items.

For each target document identified by the document pairing system 405, the content correlation system 410 identifies similarities between content items of the paired target document and content items of the source document. These content items may be sections of the foundation documents, such as chapters, sub-chapters, or paragraphs. Furthermore, the content correlation system 410 may perform the correlation for various types of content of the documents, including text, images, and tables. The content correlation system 410 establishes correlation factors between pairs of content items, which are used to determine whether the content items are similar. A correlation factor for a pair of content items indicates a degree of similarity of the pair. For example, the correlation factor is a value between 0 and 100, where 0 indicates no similarity between the pair of content items and 100 indicates the content items are identical. A process for determining correlation factors and correlating content items is described further with respect to FIG. 6.

The content mapping system 415 generates indexes mapping content items of the source foundation document to correlated content items of the target foundation documents. For each pair of a content item of the source document and a content item of a target document, the content mapping system 415 compares the correlation factor for the pair to a correlation threshold. If the correlation factor between two content items exceeds the correlation threshold, the content mapping system 415 determines the content items to be related and generates an index mapping the content items to one another. For example, if a paragraph in a target document includes more than 95% of the words in a paragraph in the source document, the content mapping system 415 maps the paragraphs to one another. In one embodiment, the index maps document part IDs of the correlated content items to one another. In another embodiment, the index maps the page location of the source document content item to the page location of the correlated target document content item (or vice versa), where the page location indicates a page number and an x-y coordinate of the content item. The content mapping system 415 stores the indexes in the correlation index database 428.

As the indexes represent similar content items in a source and paired target foundation documents, the indexes are used in one embodiment to identify portions of the source document that are not in the paired target document and vice versa. The content classification system 420 uses these differences to classify the source document. For example, the source and paired target documents are both biology textbooks. The source document includes a section devoted to cellular biology that is not included in the paired target document. Based on this difference, the content classification system 420 classifies the source document as relating to cellular biology.

In another embodiment, the indexes generated by the content mapping system 415 are used to map supplemental content layers associated with the paired target foundation document to the source foundation document. The multilayer mapping system 425 identifies content items in the paired target foundation document with which one or more supplemental content layers are associated. Using the indexes mapping these content items to content items in the source foundation document, the multilayer mapping system 425 maps the supplemental content layers to the source foundation document. In one embodiment, the multilayer mapping system 425 maps any available supplemental content layers associated with target document content items to the correlated source document content items. In another embodiment, the multilayer mapping system 425 filters the supplemental content layers based on time the layer was created, type of content, user who created the content, explicit user selection, or other factors. For example, the multilayer mapping system 425 may map any user-generated notes associated with the target document into the source document, but not map advertising layers of the target document into the source document. As another example, the multilayer mapping system 425 maps notes generated by a first user to the source document, but does not map notes generated by a second user into the source document. In another embodiment, the multilayer mapping system 425 analyzes the supplemental content layers associated with a particular target document content item to identify duplicate (or near-duplicate) content. If content is duplicated, the multilayer mapping system 425 selects a representative supplemental content item to map to the source document. The multilayer mapping system 425 stores the mapping between the supplemental content layers and content items of the source foundation document in the correlation index database 428.

Figure 5:
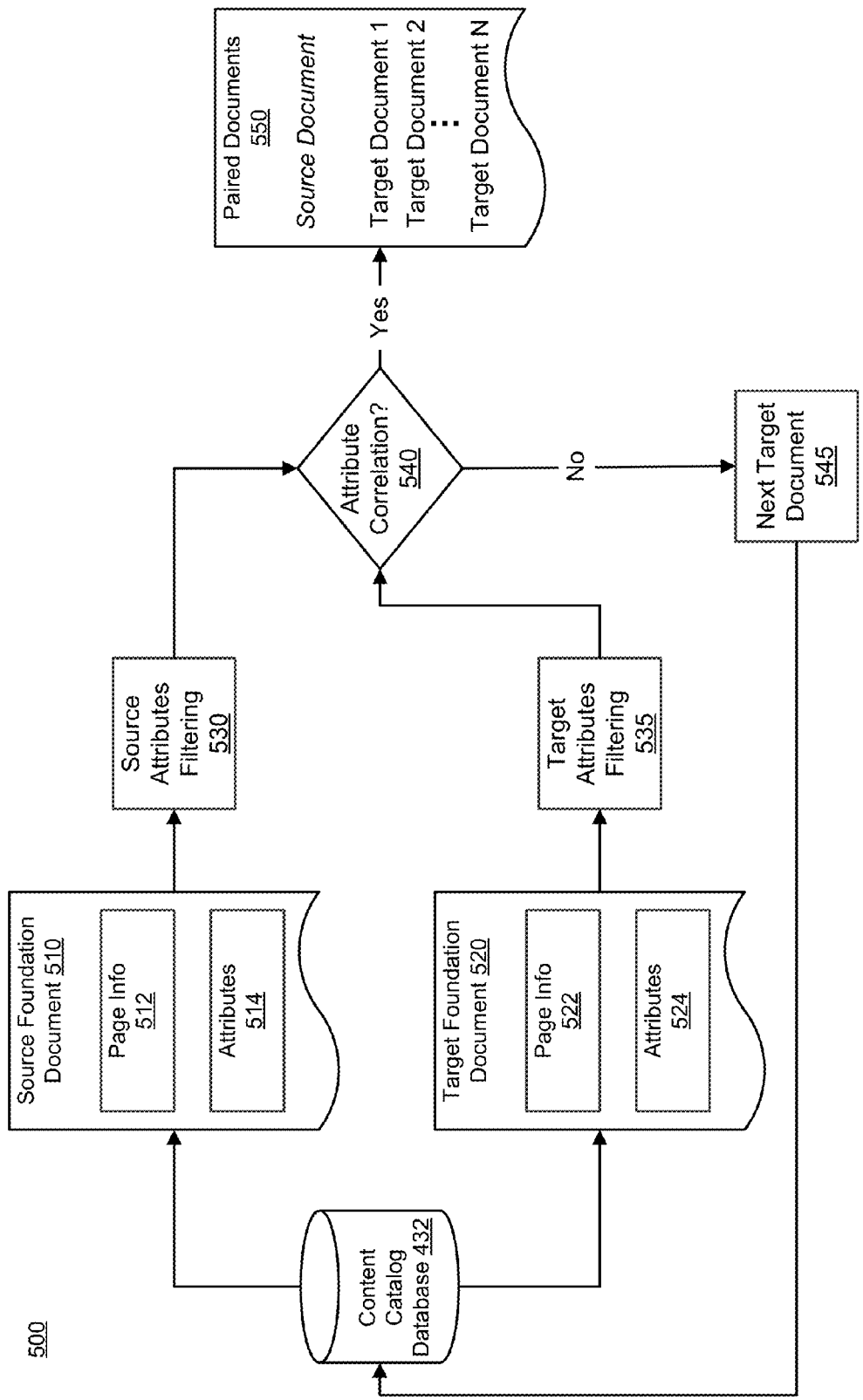
FIG. 5 illustrates a process for pairing a source document to one or more target documents, according to one embodiment.

FIG. 5 illustrates a process 500 for pairing foundation documents, according to one embodiment. In one embodiment, the steps of the process 500 are performed by the document pairing system 405. In other embodiments, other system components besides the document pairing system 405 perform the process 500. Furthermore, other embodiments of the process 500 include additional, fewer, or different steps than those shown in FIG. 5. The process 500 is performed for a source foundation document 510, which includes page info 512 and attributes 514. The source foundation document 510 is sequentially compared to target foundation documents 520 in the content catalog database 432. Like the source foundation document 510, each target foundation document includes page info 522 and attributes 524.

The document pairing system 405 filters 530 the attributes 514 of the source foundation document 510 to select attributes for correlation. For example, the document pairing system 405 filters 530 the attributes to identify a title, author, publisher, and edition number of the source foundation document 510. Similarly, for a target document 520 having page info 522 and attributes 524, the document comparison system 405 filters 535 the attributes 524 to select attributes corresponding to the attributes of the source document used for comparison.

The document pairing system 405 correlates 540 the filtered attributes of the source foundation document 510 to the filtered attributes of the target foundation document 520. If the attributes do not match, the document pairing system 405 selects a next target document 545 from the content catalog database 432 and performs the process 500 on the next target document. If the attributes do match, the document pairing system 405 pairs the target foundation document 520 and the source foundation document 510. In one embodiment, after pairing the source foundation document 510 to the target foundation document 520, the document pairing system 405 repeats the process 500 to identify and pair additional target documents to the source foundation document 510. The result of the process 500 is a set of paired documents 550, which includes the source foundation document 510 and one or more target foundation documents paired to the source document.

Figure 6:
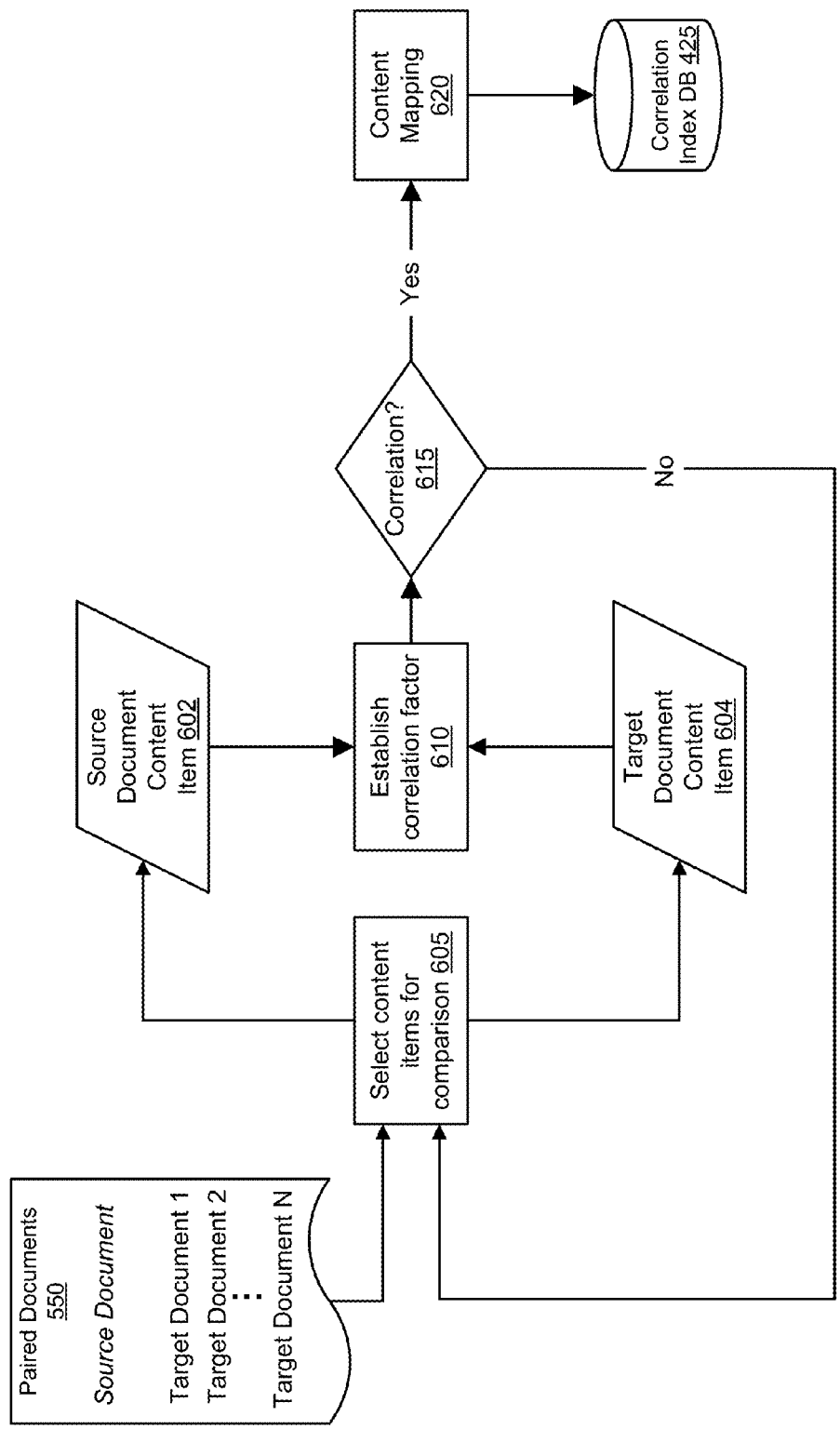
FIG. 6 illustrates a process for correlating content items between a source document and a paired target document, according to one embodiment.

FIG. 6 illustrates a process for generating a mapping between a source foundation document and one or more paired target foundation documents, according to one embodiment. In one embodiment, the steps of the process illustrated in FIG. 6 are performed by the content correlation system 410 and the content mapping system 415. In other embodiments, other system components perform the process 600. Furthermore, other embodiments of the process 600 include additional, fewer, or different steps than those shown in FIG. 6.

The content correlation system 410 selects a content item 605 from the source foundation document and a content item from a paired target foundation document for comparison. In one embodiment, the content correlation system 410 sequentially compares each content item in the source document to each content item of the same type (e.g., text or image) in the paired target document until a match is found. In another embodiment, the content correlation system 410 filters the content items to identify similar content items in the source document and paired target document. For example, before comparing a paragraph of the source document to paragraphs of the paired target document, the content correlation system 410 extracts a string from the source document paragraph and searches the paired target document for the extracted string. Any paragraph of the paired document having the extracted string is tagged for correlation to the sourced document paragraph, and any paragraph not having the extracted string is not correlated to the sourced document paragraph. In yet another embodiment, the content correlation system 410 selects 605 content items using a structure of the source and paired target foundation documents. For example, the content correlation system 410 identifies a chapter occurring in both documents based on the chapter's title. The content correlation system 410 compares the content items in the identified chapter of the source document to content items in the identified chapter of the target document. Thus, the content correlation system 410 compares content items occurring in chapters determined to be similar, rather than comparing a content item in the source document to every content item of the target foundation document.

The content correlation system 410 establishes 610 a correlation factor between a source document content item 602 and a target document content item 604. For textual content items, the content correlation system 410 establishes 610 the correlation factor by comparing text strings in the content items. In one embodiment, the content correlation system 410 performs a word-by-word comparison of the textual content items. In this case, the correlation factor represents a percentage of words in the content item of the source foundation document that are also in the content item of the target document (or vice versa). In another embodiment, the content correlation system 410 processes the textual content items with a semantic analyzer to determine a degree of semantic similarity between the items. The content correlation system 410 determines a correlation factor based on the semantic similarity of the items. For images, one embodiment of the content correlation system 410 establishes 610 the correlation factor by computing a spectral cross-correlation between the source document image and the target document image. In another embodiment, the content correlation system 410 establishes 610 the correlation factor between two images by analyzing captions of the images. For example, the content correlation system 410 performs a string comparison between the captions to determine a percentage of words of one caption that also occur in the other caption. The correlation factor between the images is calculated based on this percentage. As another example, the content correlation system 410 uses a semantic analyzer to determine a degree of semantic similarity between the captions, which is used to determine the correlation factor for the images.

For each pair of content items, the content mapping system 415 compares 615 the correlation factor established for the pair to a correlation threshold. If the correlation factor is above the correlation threshold, the content mapping system 415 determines the content items to be correlated. The content mapping system 415 generates an index to map 620 the correlated content items to one another, and stores the index in the correlation index database 428. In one embodiment, the index maps the document part ID of the source document item to the document part ID of the correlated target document item. In another embodiment, the index maps the location of the content item in the source document to the location of the content item in the target document.

Using the indexes mapping the source content items to correlated target document items, the foundation document correlation system 400 maps supplemental content layers of the target document into the source document. The supplemental content layers of the target document are mapped to content items in the target foundation document, and may include content generated while users read and interact with the target document, such as user-generated notes and highlights and dynamic terms listings. When a new source foundation document is added to the platform content catalog, the source foundation document does not have these dynamically-generated content layers. However, based on the mapping between the target foundation document and the source foundation document, the multilayer mapping system 425 maps the supplemental content layers of the target document to the source foundation document, generating a multilayered source document.

Figure 7:
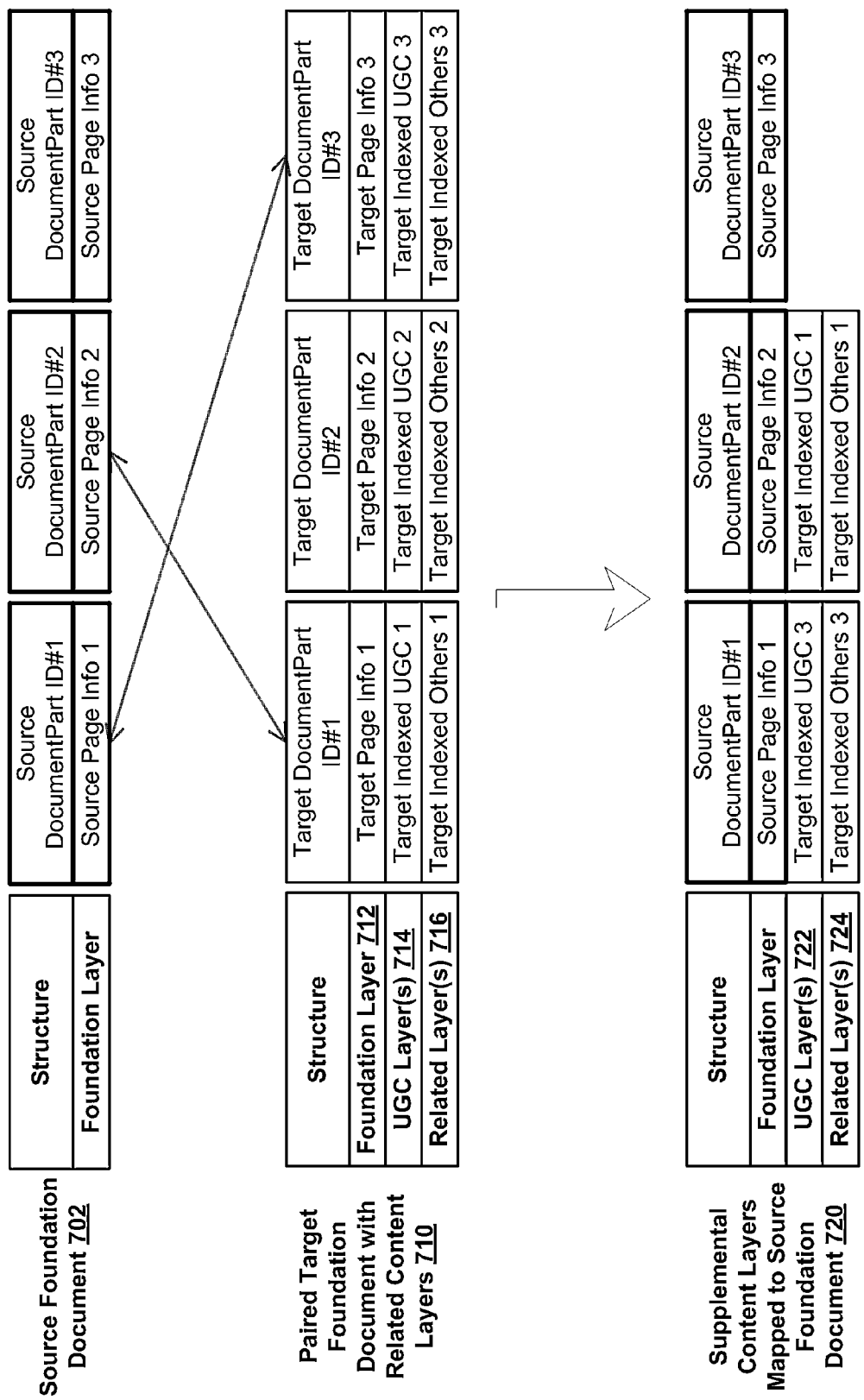
FIG. 7 illustrates an example mapping of related content layers into a source document.

FIG. 7 illustrates an example mapping of supplemental content layers of the multilayered target document to the source foundation document. For example, the source foundation document 702 is a new edition of a book recently added to the content catalog 432, and the paired target document 710 is an older edition of the book. Since the paired target document 710 has been read and interacted with by users, the target document has a user-generated content (UGC) layer 714 and a related content layer 716 mapped to content items of the foundation layer 712. In the example shown in FIG. 7, a correlation is found between source content item #1 and target content item #3, and between source content item #2 and target content item #1. Thus, these content items are mapped to one another, as indicated by arrows in FIG. 7. A correlation is not found between source content item #3 and the target document content items; thus, this content item is not mapped to target document content items. Based on the mapping between content items in the source document and content items in the paired target document, the UGC and related content items associated with the correlated content items of the target document are mapped to the content items of the source document. Accordingly, a UGC layer 722 and related content layer 724 are created for the source document 702, creating a multilayered source document 720 with supplemental content layers mapped to the source foundation document 702. By mapping the supplemental content layers of the paired target document into the source document, the foundation document correlation system 400 provides users with convenient access to the supplemental content associated with the paired target document. Thus, users can readily access a rich history of supplemental content generated by other users interacting with the target document without needing to access the target document.

ADDITIONAL CONFIGURATION CONSIDERATIONS

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for mapping supplemental content layers to an electronic source document stored by an electronic publishing platform, the source document being a later edition of an electronic target document, the method comprising:

accessing the target document, the target document having an electronic supplemental content layer including electronic content associated with content of the target document, wherein portions of the electronic content of the supplemental content layer are mapped to respective content items in the target document, and wherein the target document is an earlier edition of the source document;

for each of a plurality of content items in the target document:
identifying a content item in the source document similar to the content item in the target document;
adding, to an index stored by the electronic publishing platform, a mapping between the identified content item in the source document and the content item in the target document; and
mapping the portion of the electronic content of the supplemental content layer mapped to the content item in the target document to the identified content item in the source document based on the index; and storing the portions of electronic content of the supplemental content layer mapped to content items in the source document as a supplemental content layer associated with the source document.

2. The method of claim 1, wherein the electronic publishing platform includes a product catalog comprising a plurality of documents, the method further comprising:
identifying the target document in the product catalog based on product attributes of the source document and product attributes of the target document.

3. The method of claim 2, wherein the product attributes of the source document comprise a subject matter domain and at least one of a title, publisher, and author, and wherein identifying the target document based on product attributes of the source document and product attributes of the target document comprises:
filtering the plurality of documents in the product catalog based on the subject matter domain; and
selecting the target document based on a correlation between one or more of the title of the source document and a title of the target document, the publisher of the source document and a publisher of the target document, and the author of the source document and an author of the target document.

4. The method of claim 1, wherein adding the mapping between an identified source document content item and a target document content item to the index stored by the electronic publishing platform comprises:
identifying a location of the identified source document content item in the source document;
identifying a location of the target document content item in the target document; and
storing a mapping from the identified location of the source document content item to the identified location of the target document content item.

5. The method of claim 4, wherein identifying the location of the identified source document content item and the location of the target document content item comprises:
identifying spatial coordinates of the identified source document content item on a page of the source document; and
identifying spatial coordinates of the target document content item on a page of the target document.

6. The method of claim 4, wherein identifying the location of the identified source document content item and the location of the target document content item comprises:
retrieving a document part identifier of the identified source document content item and a document part identifier of the target document content item, each document part identifier specifying the location of the corresponding content item.

7. The method of claim 4, wherein the source document and the target document are each associated with document structure metadata specifying the locations of content items in a corresponding document.

8. The method of claim 1, further comprising:
establishing a correlation factor between a source document content item and a target document content item; and
responsive to the correlation factor exceeding a correlation threshold, determining the source document content item and the target document content item to be similar.

9. The method of claim 8, wherein the source document content item and the target document content item each comprise text, and wherein establishing the correlation factor comprises:
determining a percentage of text of the source document content item occurring in the target document content item, wherein the correlation factor is established based on the determined percentage.

10. A non-transitory computer readable storage medium storing executable computer program instructions for mapping supplemental content layers to an electronic source document stored by an electronic publishing platform, the source document being a later edition of an electronic target document, the computer program instructions comprising instructions for:
accessing the target document, the target document having an electronic supplemental content layer including electronic content associated with content of the target document, wherein portions of the electronic content of the supplemental content layer are mapped to respective content items in the target document, and wherein the target document is an earlier edition of the source document;
for each of a plurality of content items in the target document:
identifying a content item in the source document similar to the content item in the target document;
adding, to an index stored by the electronic publishing platform, a mapping between the identified content item in the source document and the content item in the target document; and
associating the portion of the electronic content of the supplemental content layer mapped to the content item in the target document with the identified content item in the source document based on the index; and
storing the portions of electronic content of the supplemental content layer mapped to content items in the source document as a supplemental content layer associated with the source document.

11. The non-transitory computer readable storage medium of claim 10, wherein the electronic publishing platform includes a product catalog comprising a plurality of documents, the computer program instructions further comprising instructions for:
identifying the target document in the product catalog based on product attributes of the source document and product attributes of the target document.

12. The non-transitory computer readable storage medium of claim 11, wherein the product attributes of the source document comprise a subject matter domain and at least one of a title, publisher, and author, and wherein identifying the target document based on product attributes of the source document and product attributes of the target document comprises:

filtering the plurality of documents in the product catalog based on the subject matter domain; and selecting the target document based on a correlation between one or more of the title of the source document and a title of the target document, the publisher of the source document and a publisher of the target document, and the author of the source document and an author of the target document.

13. The non-transitory computer readable storage medium of claim 10, wherein adding the mapping between an identified source document content item and a target document content item to the index stored by the electronic publishing platform comprises:

identifying a location of the identified source document content item in the source document;

identifying a location of the target document content item in the target document; and storing a mapping from the identified location of the source document content item to the identified location of the target document content item.

14. The non-transitory computer readable storage medium of claim 13, wherein identifying the location of the identified source document content item and the location of the target document content item comprises:

identifying spatial coordinates of the identified source document content item on a page of the source document; and identifying spatial coordinates of the target document content item on a page of the target document.

15. The non-transitory computer readable storage medium of claim 13, wherein identifying the location of the identified source document content item and the location of the target document content item comprises:

retrieving a document part identifier of the identified source document content item and a document part identifier of the target document content item, each document part identifier specifying the location of the corresponding content item.

16. The non-transitory computer readable storage medium of claim 13, wherein the source document and the target document are each associated with document structure metadata specifying the locations of content items in a corresponding document.

17. The non-transitory computer readable storage medium of claim 10, the computer program instructions further comprising instructions for:

establishing a correlation factor between a source document content item and a target document content item; and responsive to the correlation factor exceeding a correlation threshold, determining the source document content item and the target document content item to be similar.

18. The non-transitory computer readable storage medium of claim 17, wherein the source document content item and the target document content item each comprise text, and wherein establishing the correlation factor comprises:

determining a percentage of text of the source document content item occurring in the target document content item, wherein the correlation factor is established based on the determined percentage.

19. A computer-implemented method for mapping related content layers to an electronic source document, the method comprising:

accessing a product catalog of an electronic publishing platform including a plurality of electronic foundation documents, the foundation documents each having related content layers comprising portions of electronic content mapped to respective content items of a corresponding foundation document;

receiving the source document;

identifying a target foundation document in the product catalog having content similarities to the source document, the target foundation document identified based on product attributes of the source document and product attributes of the target foundation document;

for each of a plurality of content items in the identified target foundation document:

identifying a content item in the source document similar to the content item in the target foundation document;

adding, to an index stored by the electronic publishing platform, a mapping between the identified content item in the source document and the content item in the identified target foundation document; and mapping the portion of electronic content of a related content layer associated with the content item in the target foundation document to the identified content item in the source document based on the index; and storing the portions of electronic content of the related content layers mapped to content items in the source document as a related content layer associated with the source document.

* * * * *